United States Patent [19]

Khachikian

[11] Patent Number: 4,693,437
[45] Date of Patent: Sep. 15, 1987

[54] SPOILERON CONTROL MECHANISM

[76] Inventor: Harry Khachikian, 636 N. Kenwood, Burbank, Calif. 91505

[21] Appl. No.: 659,943

[22] Filed: Oct. 11, 1984

[51] Int. Cl.[4] .................. B64C 13/04; B64C 13/30; B64C 13/32
[52] U.S. Cl. .................. 244/225; 244/90 A; 74/471 XY; 74/480 R
[58] Field of Search .................. 244/90 R, 90 A, 213, 244/221, 225, 230, 232, 234, 237; 74/471 R, 471 XY, 479, 480 R

[56] References Cited

U.S. PATENT DOCUMENTS

| | | | |
|---|---|---|---|
| 1,830,429 | 11/1931 | Elsby, Jr. | 244/225 |
| 2,381,721 | 8/1945 | Carroll | 244/225 |
| 3,241,640 | 3/1966 | McCordic et al. | 74/471 |
| 3,589,206 | 6/1971 | Herbon | 74/471 |
| 3,789,692 | 2/1974 | Farr | 244/232 |
| 4,088,038 | 5/1978 | Paul | 74/479 |

Primary Examiner—Galen L. Barefoot

[57] ABSTRACT

A spoileron control mechanism is shown which provides for separate or simultaneous braking and rolling of the aircraft through operation of spoilers located on the wings. The control mechanism includes a base to which is mounted two pivot brackets 2. Pivotally mounted to the base are two bell cranks 3 to which are connected via cables 15 to the spoiler. The bell cranks are pivoted in a scissors like fashion by connection via arms 7 to slotted plates 5 that are also pivoted side to side by a control stick 13 which causes the bell cranks to operate the spoilers in a differential fashion for roll control. The bell cranks are further actuated by a lever 10 which causes a cam bar 8 to act on the arms 7 pivoting the bell cranks and causing the spoilers to be actuated simultaneously for braking of the aircraft.

3 Claims, 8 Drawing Figures

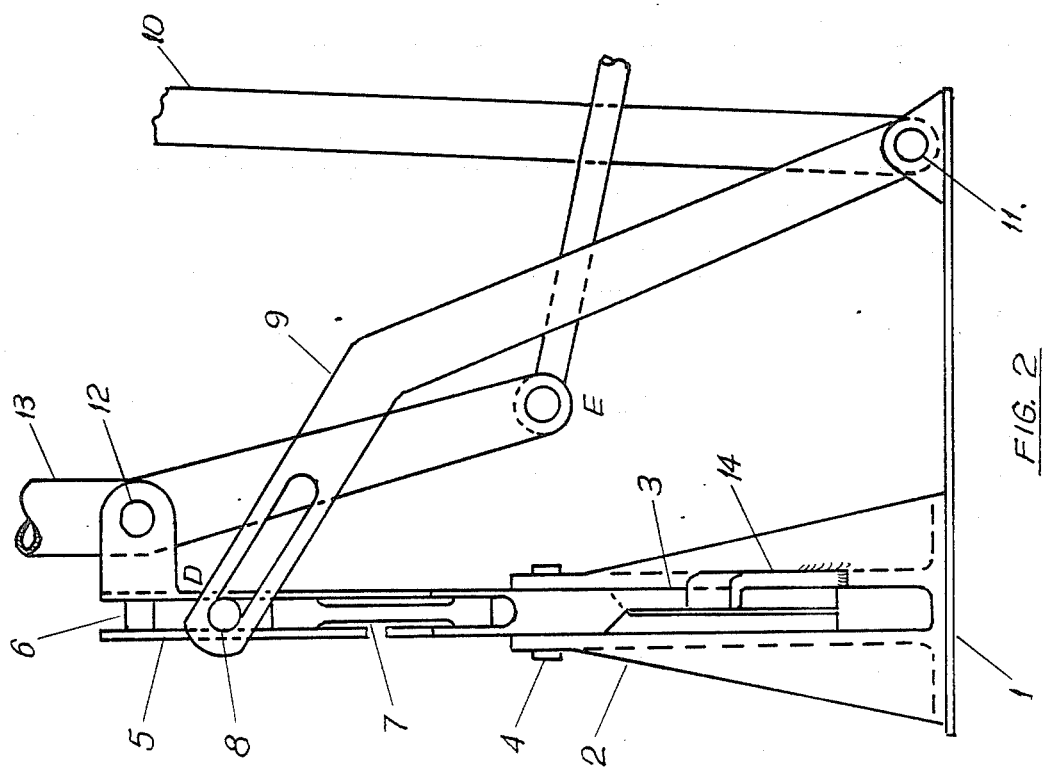
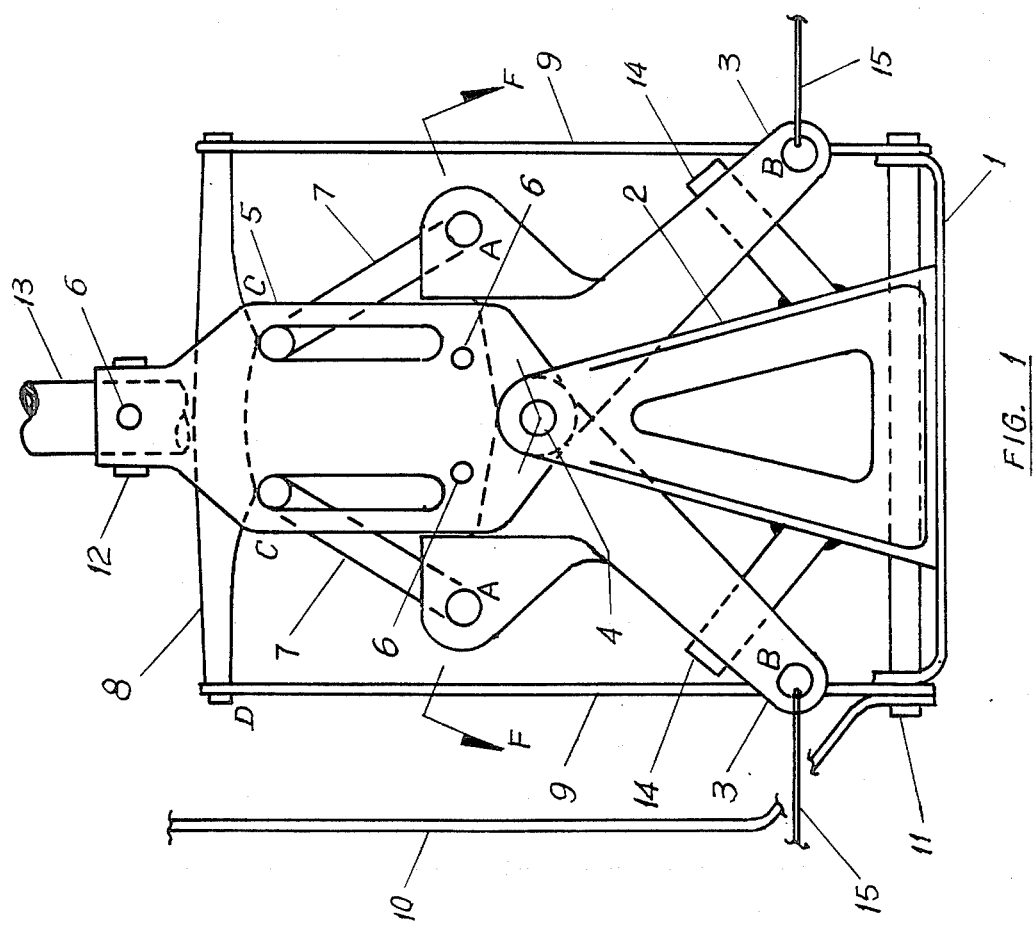

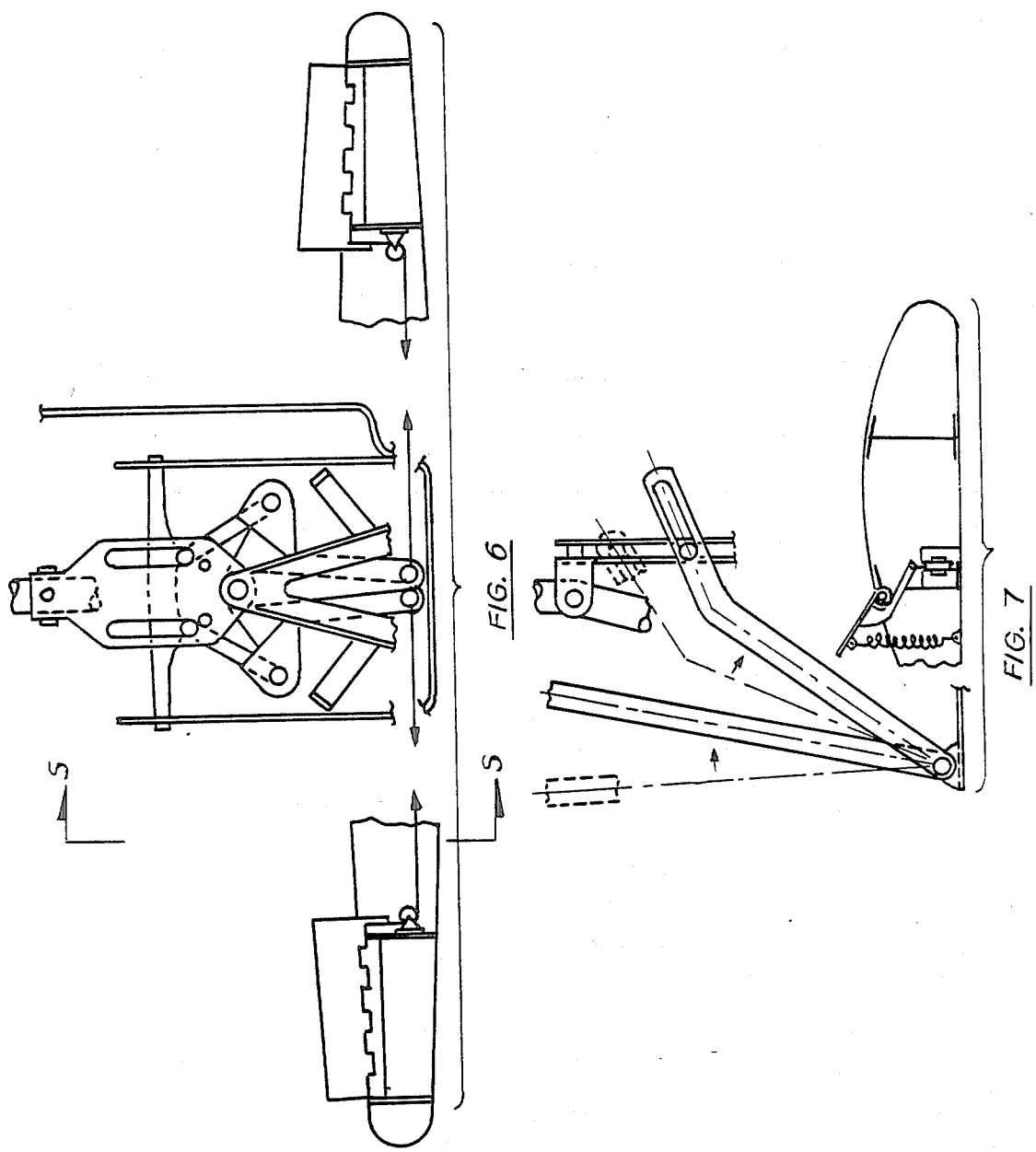

SPOILERON CONTROL MECHANISM

SUMMARY OF THE INVENTION

The spoileron control mechanism is a device which enables the pilot of an airplane to use the wing control surfaces as: (1) brakes or "spoilers" (for drag increase effect), (2) ailerons (for roll control) or (3) simultaneously, both effects described above.

The advantages of this mechanism are:

(1) Being a simple device it is very suitable on small (home build) aircrafts where lightness and simplicity counts (in opposition to the big airplanes which use complicated and heavy electro-hydraulic system with implication of multiple devices, to accomplish the effects described above);

(2) Being a simple device, it's cost saving item which, again, has high regard in building small airplane;

(3) The maintenance obviously is simple too.

DESCRIPTION OF DRAWINGS

FIG. 1 is the front (looking aft) view of the mechanism;

FIG. 2 is the side view of the mechanism;

FIG. 6 shows the action for braking effect;

FIG. 7 is the side view of the FIG. 6;

DESCRIPTION OF THE INVENTION

Figure 3:
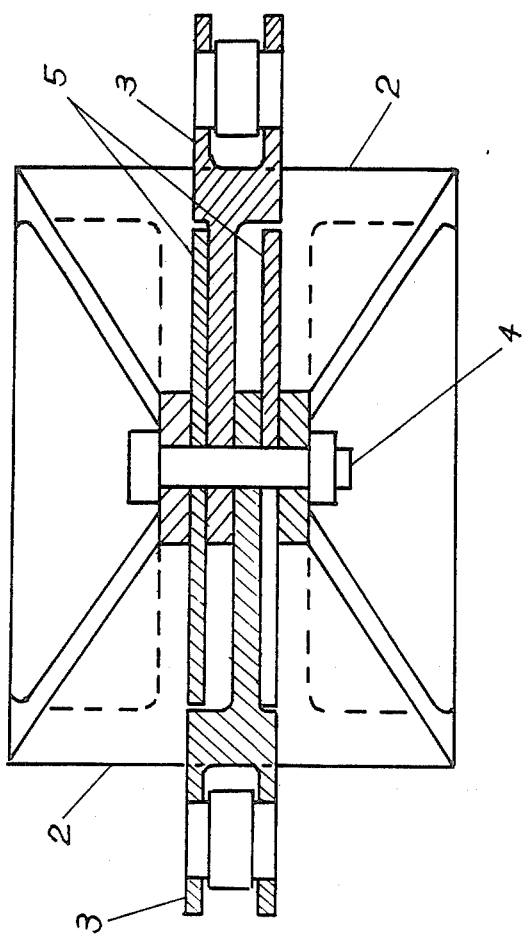
FIG. 3 is a cross section through the main pivot.
Figure 4:
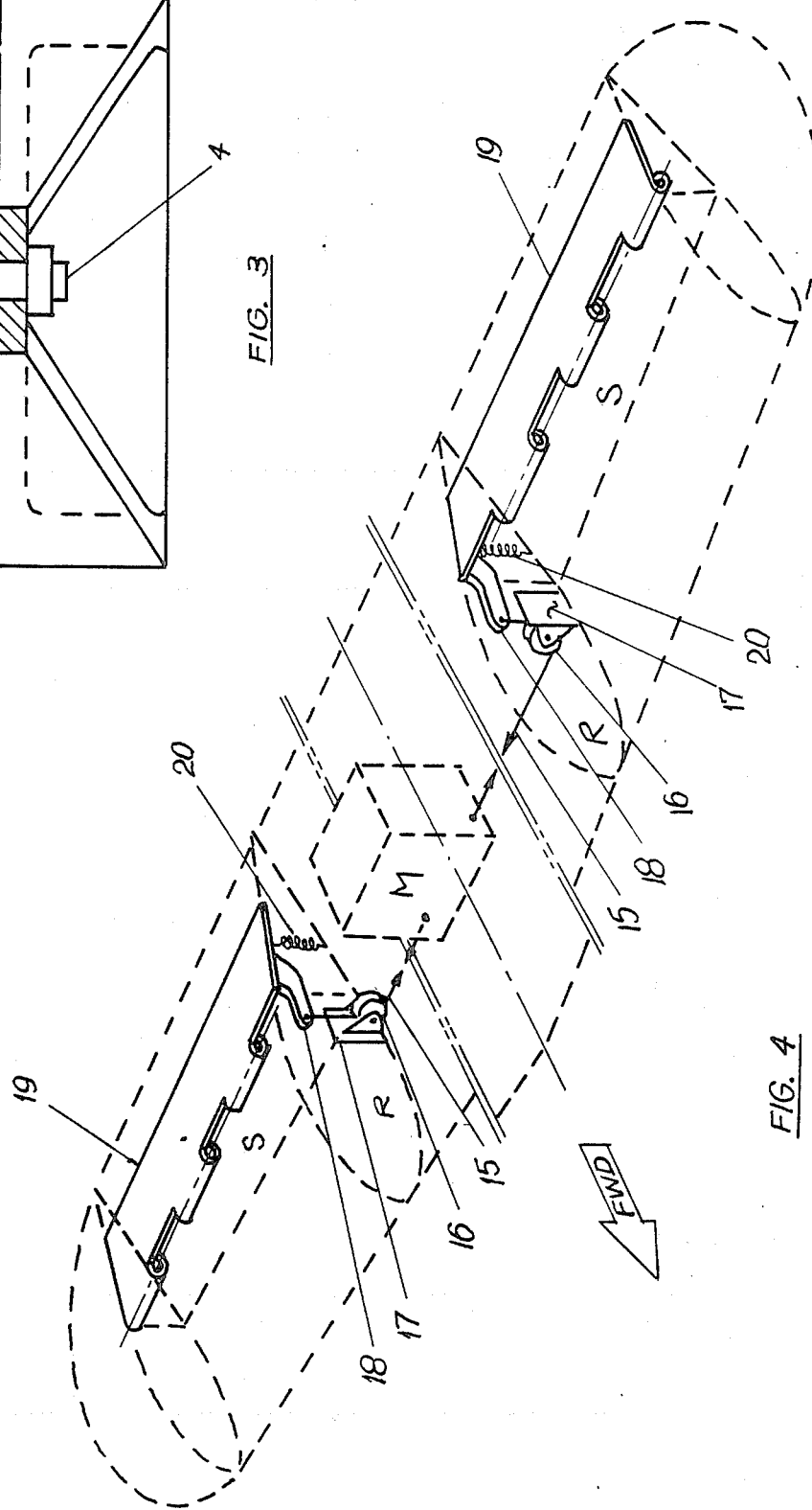
FIG. 4 is the overall arrangment of the mechanism with respect to the wing control surfaces.

The mechanism of FIGS. 1, 2, 3 and 4 is composed of the following elements: base panel 1, providing support for the device; pivot brackets 2, attached to the base panel, are supporting two bell crank arms 3 on their main lugs, through pin 4 (they are articulated like two scissors blades), sandwiched (but free to rotate) between the two lugs of the rocker stem 5, rotating on the same central pin 4. The rocker stem is composed of two plates, provided with two symmetrical guiding slots vertically and held together by three spacer studs 6. The ends "A" of the bell crank arms are pin-joined with rocker arms 7, which have the other ends "C" sliding into the rocker stem slots. The cam bar 8, also, can slide between the two plates of the rocker stem, pushed down by the bent arms 9, actuated, on its turn, by the brake lever 10. The subassembly of these three elements: cam bar, bent arms and lever is articulated to the base panel by the pivot bar 11. The ends of the cam bar can also slide into the slots provided at the upper end of the bent arms. The control stick 13 is pin-joined to the rocker stem through pin 12. The ends "B" of the bell crank arms are attached to the control cables 15 and their outward motion is limited by the stops 14. Cables 15 are extended to both sides, through pulleys 16 (supported on the wing rib structure by the brackets 17) to the control horns 18 attached to the spoiler surface 19. The spoilers are attached to the upper cap of the wing rear spar by a structural hinge and kept closed (acting against the pulling action of the cables) by the springs 20.

Figure 5:
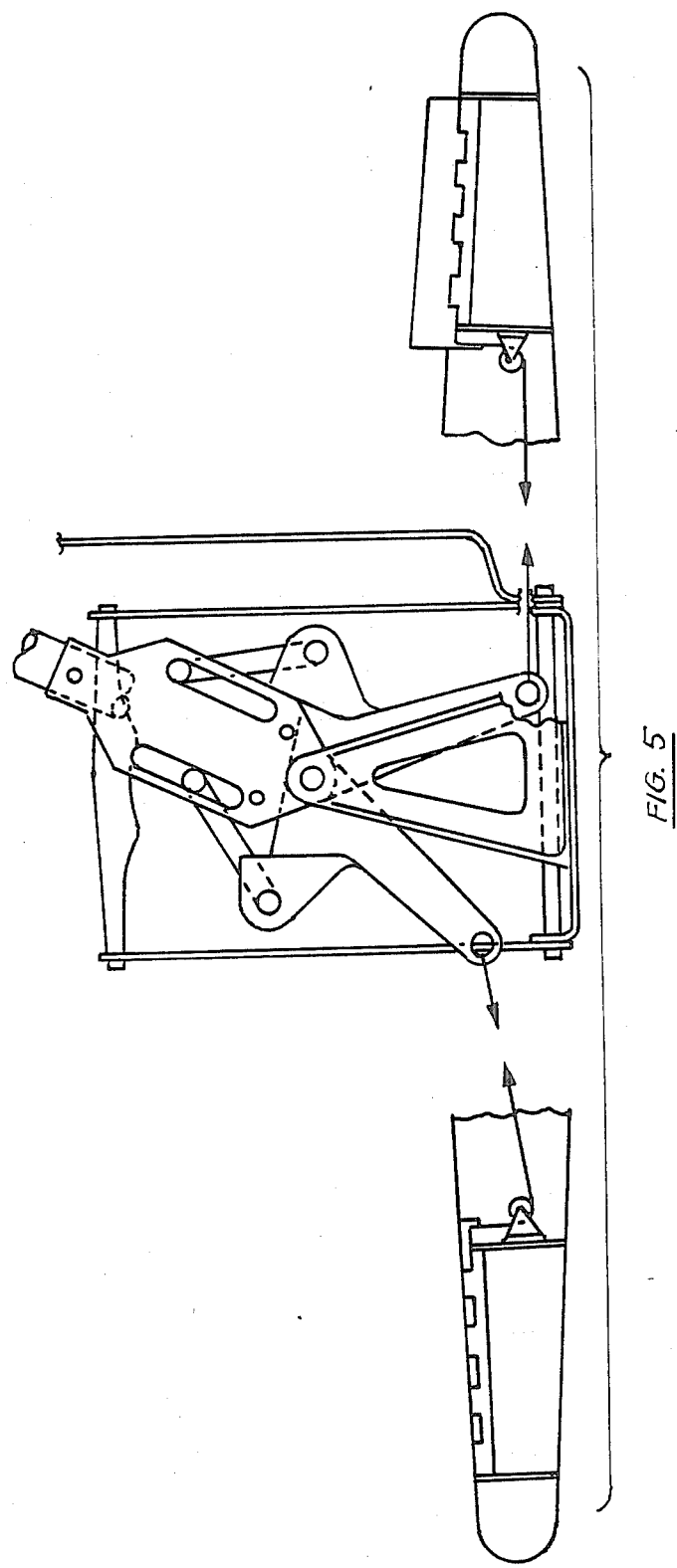
FIG. 5 shows the action for rolling effect.

FIG. 5 represents the mechanism working as aileron control system. For example, to roll the aircraft to the left, the stick is moved left which simultaneously moves to left the rocker stem 5 on its turn it pushes left rocker arm 7, which will force left bell crank arm 3 to rotate inb'd, pulling the left cable 15. This is pulling the horn 18, forcing the spoiler 19 to rotate about its hinge, against the spring 20. The spoiler stays open (on the left) whereas the opposite one (on the right) remains closed. This asymmetrical deployment of the spoilers will induce the rolling effect of the aircraft to the left.

FIG. 6 and FIG. 7 represents the mechanism working as brake ("spoiler") effect. Pushing fwd. The lever 10, it will push down the cam bar 8, through the bent arms 9. When 8 goes down it pushes the ends "C" of the rocker arms 7 down also, which will make both bell crank arms 3 rotate simultaneously and equally. They pull both cables 15, thus elevating both spoilers with the same amount, inducing the increased drag (braking or "spoiling") effect.

Figure 8:
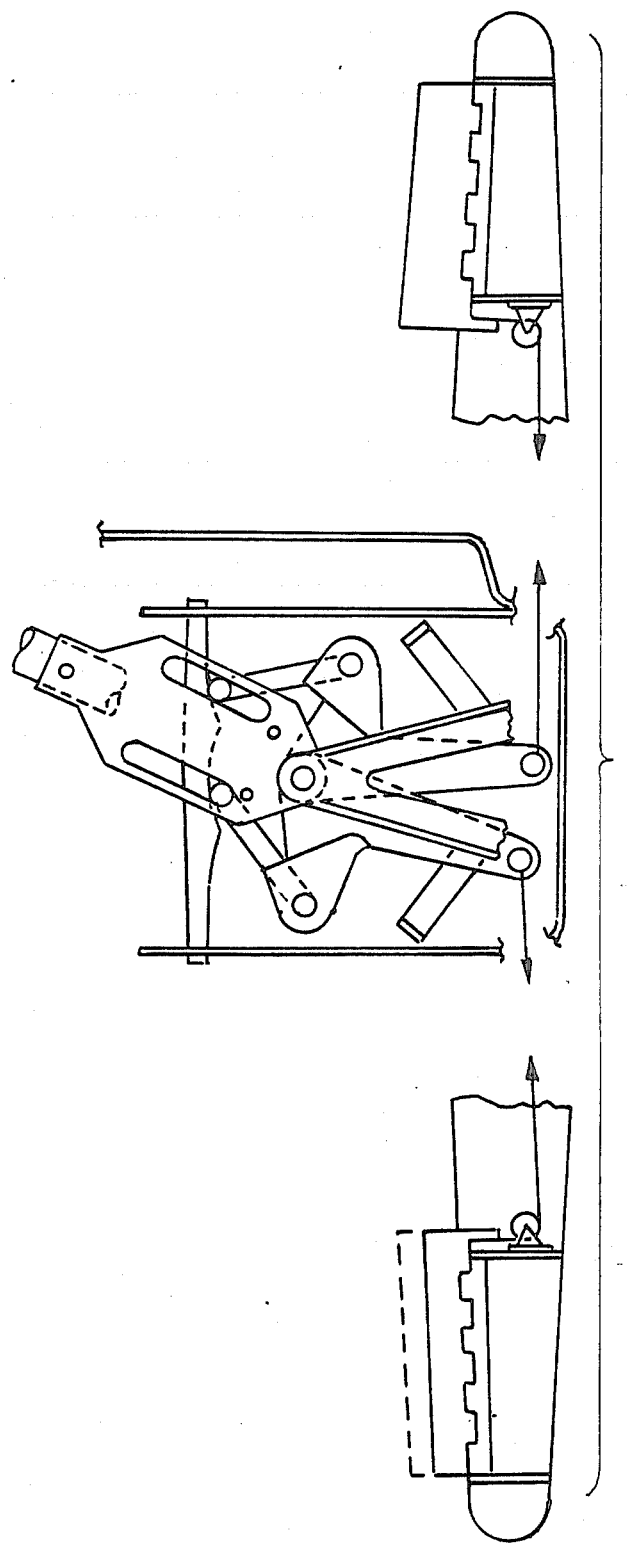
FIG. 8 shows the simultaneous action for both effects.

FIG. 8 represents the mechanism working as aileron and as spoiler, both in the same time. Considering, for example, the system in the braking attitude (both spoilers deployed, like above), by moving the stick, again, to the left, the end "C" of the right rocker arm 7 moves to the left, which will rotate point "A" of the bell crank arm 3 upward; correspondingly, the point "B" moves to the right, releasing the right cable and letting the right spoiler to retract a proportional amount with the stick movement. Here, like in FIG. 5 case, the differential deployment of the spoilers will give the aircraft, beside of a braking (faster descent) effect, a rolling motion as well.

What is claimed is:

1. A mechanical device, inducing separately or simultaneously braking and rolling effect of an aircraft, and being composed of: a base panel as support for the whole device; two pivot brackets affixed to the said base panel; two bell crank arms supported by a pin on the said pivot brackets and rotating with respect to each other like two scissors blades; a rocker stem pivoting on the same said pivot brackets and being composed of two slotted plates, held together by three spacer studs; a (control) stick, supported in a lug-pin type joint of the said rocker stem and rotating in a plane normal to the rotating plane of the rocker stem; two rocker arms (one on each side) connected with one end to the upper ends of the bell crank arms in a lug-pin joints and having the other ends sliding into the vertical slots provided in the said rocker stem plates.

2. The mechanical device of claim one wherein, the said bell crank arms have their lower ends connected to cables; two stops affixed to the said pivot brackets, which limit the outward motion of the said bell crank arms; two pulleys guiding the cable motion to the control surfaces; two rib brackets attached one on each side of the wing to the supporting ribs, carrying the said pulleys; two spoilers (control surfaces) hinged to the wing rear spar; two control horns (one for each spoiler and attached thereto); the said cables after passing through pulley mechanisms are connected to the said control horns; two springs (one for each spoiler and attached thereto in opposition to the control horn), working against the pulling action of the cables.

3. The mechanical device of claim one, wherein the said rocker arms are acted upon their upper ends by a cam bar, which can slide horizontally and parallel with itself between the two plates of the said rocker stem; a subassy. of two bent arms, a lever welded to the lower end of the left bent arm and a pivot bar welded to the lower ends of the both bent arms, is articulated through the said pivot bar to the said base plate (panel); the upper ends of the bent arms are slotted and supporting the ends of the said cam bar which are extending outward on both sides of the said rocker stem.

* * * * *